Patented Dec. 16, 1952

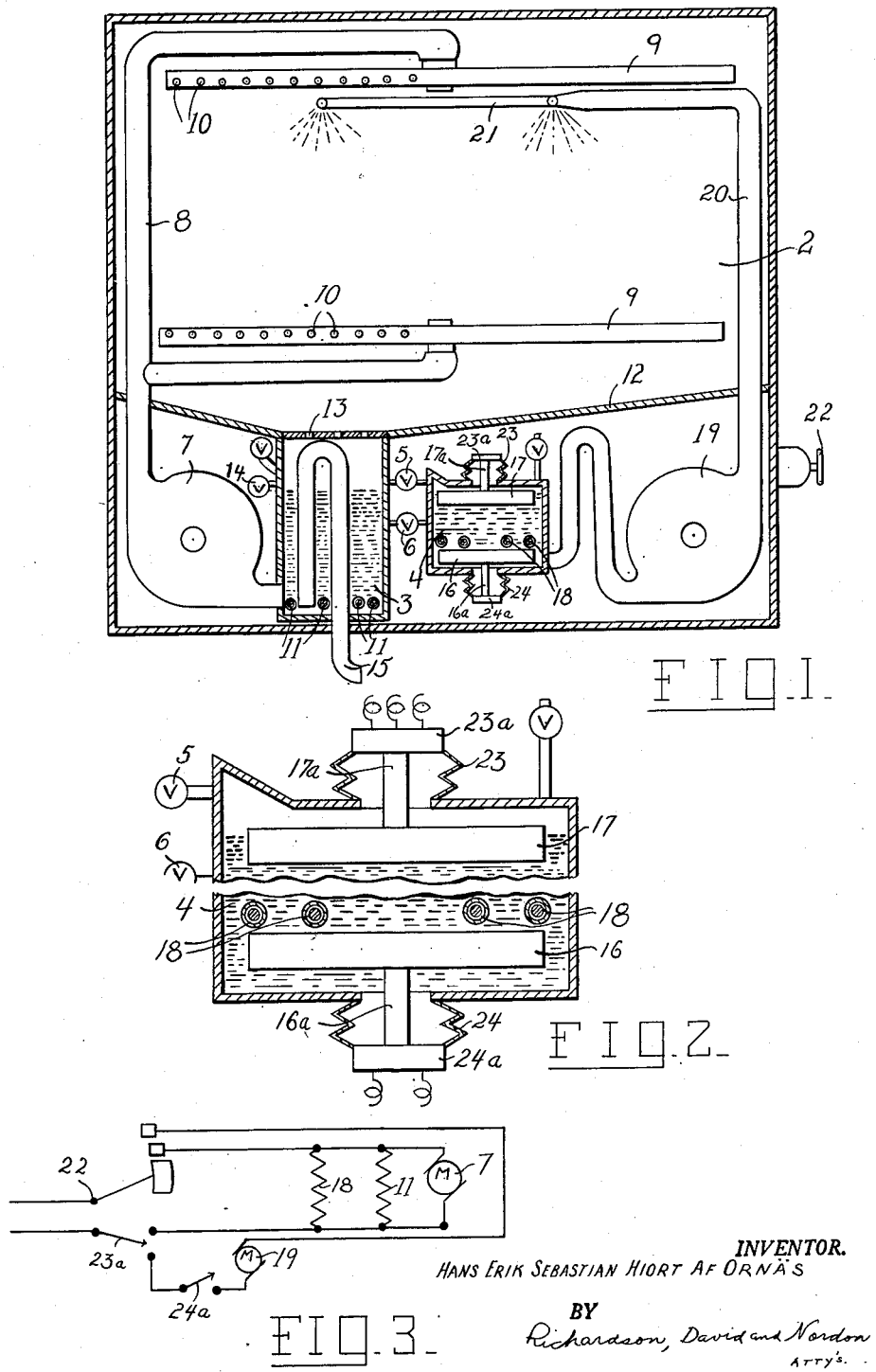
Dec. 16, 1952 — H. E. S. HIORT AF ORNAS — 2,621,666
DISHWASHING MACHINE
Filed Oct. 11, 1949
INVENTOR.
HANS ERIK SEBASTIAN HIORT AF ORNÄS
BY Richardson, David and Nordon
Atty's.

2,621,666

UNITED STATES PATENT OFFICE 2,621,666

DISHWASHING MACHINE

Hans Erik Sebastian Hiort af Ornas, Stockholm, Sweden

Application October 11, 1949, Serial No. 120,741
In Sweden October 14, 1948

3 Claims. (Cl. 134—57)

The present invention relates to a dish washer of the type having a pump or the like by which a washing fluid introduced into a container is caused to spray the goods which are to be washed in the washing chamber, as well as means for controlling the washing procedure arranged in a vessel for rinsing water. The invention is characterized in that heating elements are provided for the washing fluid container and for the rinsing water vessel, said elements being automatically connected when the vessel has been filled with rinsing water, for the successive heating of the washing fluid and the rinsing water respectively, means being provided for interrupting the spraying of the goods with the washing fluid, as well as for starting a device for spraying said goods with the rinsing water, whereafter the heating elements and said last-mentioned device are automatically disconnected.

Fig. 1 is a partly sectional view of the dish washer.

Fig. 2 is an enlarged view of a portion of the washer.

Fig. 3 is a schematic diagram of the electrical circuits.

Numeral 2 denotes a washing chamber communicating through an opening in the bottom with a container 3 for the washing fluid and arranged below the washing chamber. Laterally of the container 3 is located a vessel 4 for rinsing water. The container 3 and the vessel 4 are connected with each other by means of conduits controlled by cocks 5 and 6. Numeral 7 denotes a pump driven by an electric motor, said pump communicating by means of a conduit 8 with rotatable arms 9 arranged centrally, one above the other, in the washing chamber 2. The washing basket (not shown in the drawing) is placed between said arms, and apertures 10 are made in the arms so that the goods can be sprayed with the washing fluid when said fluid is driven from the pump 7 from the container 3 to the arms 9. The washing fluid which is heated by electric heating elements 11 in the bottom portion of the container 3, flows, after having been ejected into the washing chamber, along the inclined bottom 12 of said chamber through a detachable screen 13 over the opening into the container again. On a level with the cock 5 is arranged an overflow cock 14 for the washing fluid in the container. Numeral 15 denotes a siphon for drawing the water from the container 3 to the outlet.

Numerals 16 and 17 denote two floats in the vessel 4 for the rinsing water, said floats having projecting members 16a and 17a, and 18 denotes electrical heating elements arranged in the bottom portion of said vessel. Numeral 19 denotes a pump driven by an electric motor and communicating with the vessel 4. Said pump communicates by means of a conduit 20 with a spraying pipe 21 arranged in the upper portion of the washing chamber. On the outer side of the dish washer is provided a switch 22 having two positions, one for closing the current to the electric elements 11 and 18 only, and one for closing the current to said elements and to the pump 7. In the top and bottom portions of the vessel 4 are arranged metal bellows 23, and 24 respectively, into which the members 17a and 16a respectively project and at which are arranged electric mercury switches 23a, and 24a respectively, for example, which, in dependence upon the position of the respective member in the bellows, close and break the current to the elements 11 and 18, and to said elements and to the pump 7 and 19 respectively.

The dish washer operates in the following manner:

Water is tapped into the container 3 and the cocks 5 and 6 are open so that the rinsing water vessel 4 at the same time is filled. The water level in the container and in the vessel is then controlled by the overflow cock 14 which also is open. When the container and the vessel have been filled with water, the cocks 5, 6 and 14 are shut, and the upper float 17, which then is in its highest position, actuates by the member 17a the bellows 23 so that it is widened, and the lower float 16 which also is in its highest position leaves with its member 16a the bellows free so that the latter can be contracted.

The projecting element in bellows 23 then actuate mercury switch 23a which closes the current to the elements 11 and 18, and to the pump 7 so that the washing fluid and the rinsing water are gradually heated and the pump 7 drives the washing fluid from the container to the rotating arms 9, which under rotation spray the goods to be washed in the washing chamber 2 and then the water flows down into the container 3 where it is further heated. The electric elements 11 and 18 and the volumes of the wash and the rinse chambers are dimensioned in such a manner that the washing fluid has obtained a suitable temperature when the water is boiling in the rinsing water container. When the water begins to boil in the vessel 4, the rinsing water is forced over to the pump 19, the upper float 17 sinking and the mercury switch 23 which no longer is actuated by the bellows 23, breaking the current to the pump 7 and to the elements 11 and 18, and closing the current to the pump 19 which begins to work and forces the rinsing water through the pipe 20 up to the spraying pipe 21 so that the goods are rinsed with boiling water. When the greatest part of the water in the rinsing water vessel 4 has been pumped off, the lower float 16 sinks and its member 16a then actuates the bellows 24, so that the latter is actuated and in its turn actuates the mercury switch 24a which breaks the current to the pump 19. The current to the machine is now broken and the machine has ceased to function. All the rinsing water has flowed down into the container 3, the water level of which thereby has risen so much that the siphon 15 empties the container.

The invention is not restricted to the shown embodiment but its details may be varied in many ways without going beyond the scope of the same. The electric devices may be such that the switch 22 must first close the current to the machine whereafter the machine operates as described above. It is also possible to close the current directly to the heating elements by means of the switch, and steps may be taken to automatically connect the pump for the washing process when the washing fluid has reached a desired temperature. In this case the mercury switch which stops the motor when two motors are provided, shall change the direction of rotation of said single motor. Means in the washing chamber for the spraying of the washing fluid may be placed in any suitable place both in relation to the goods to be washed and to the walls of the washing chamber.

Having now described my invention, what I claim as new and desire to secure by Letters Patent is:

1. A dish washing machine comprising a washing chamber, a container having a washing liquid, a primary pump having an inlet connected to said container and including nozzle means connected thereto in the washing chamber for spraying dirty goods in the washing chamber with the washing liquid, a container having rinsing water, a secondary pump having an inlet connected to said container and including nozzle means connected thereto in the washing chamber for rinsing the goods with the rinsing water, heating elements in the washing liquid container and in the rinsing water container, said heating elements being adapted to be automatically connected when the rinsing water container is filled with rinsing water, two switches, floats in the rinsing water container, arranged one above the other, members projecting from the floats for actuating the switches, one of said switches being so connected with the primary pump and heating elements that it can interrupt the spraying of the goods with the washing liquid and be disconnected from the heating elements and start the secondary pump when the rinsing water container begins to be emptied, the other switch being so connected with the secondary pump that it can stop such pump when the liquid in the rinsing water container has been almost consumed.

2. A dish washing machine comprising a washing chamber, a container having a washing liquid, a primary pump having an inlet connected to said container and including nozzle means connected thereto in the washing chamber for spraying dirty goods in the washing chamber with the washing liquid, a container having rinsing water, a secondary pump having an inlet connected to said container and including nozzle means connected thereto in the washing chamber for rinsing the goods with the rinsing water, heating elements in the washing liquid container and in the rinsing water container, said heating elements being adapted to be automatically connected when the rinsing water container is filled with rinsing water, two switches, floats in the rinsing water container, arranged one above the other, members projecting from the floats for actuating the switches, one of said switches being so connected with the primary pump and heating elements that it can interrupt the spraying of the goods with the washing liquid and be disconnected from the heating elements and start the secondary pump when the rinsing water container begins to be emptied, the other switch being so connected with the secondary pump that it can stop such pump when the liquid in the rinsing water container has been almost consumed, a bellows, the projecting member on the upper float when the rinsing water container has been filled with water and such float is in its uppermost position being adapted to actuate the bellows so that the latter is widened and thereby actuates one of the switches to connect the heating elements in the washing liquid container and in the rinsing water container and also to actuate the primary pump.

3. A dish washing machine comprising a washing chamber, a container having a washing liquid, a primary pump having an inlet connected to said container and including nozzle means connected thereto in the washing chamber for spraying dirty goods in the washing chamber with the washing liquid, a container having rinsing water, a secondary pump having an inlet connected to said container and including nozzle means connected thereto in the washing chamber for rinsing the goods with the rinsing water, heating elements in the washing liquid container and in the rinsing water container, said heating elements being adapted to be automatically connected when the rinsing water container is filled with rinsing water, two switches, floats in the rinsing water container, arranged one above the other, members projecting from the floats for actuating the switches, one of said switches being so connected with the primary pump and heating elements that it can interrupt the spraying of the goods with the washing liquid and be disconnected from the heating elements and start the secondary pump when the rinsing water container begins to be emptied, the other switch being so connected with the secondary pump that it can stop such pump when the liquid in the rinsing water container has been almost consumed, a bellows, the projecting member on the lower float when almost all the water has been emptied from the rinsing water container and said float is in its lowermost position being adapted to actuate and widen the bellows, and thereby actuate one of the switches for breaking the current to the secondary pump.

HANS ERIK SEBASTIAN HIORT AF ORNAS.

REFERENCES CITED

The following references are of record in the file of this patent:

UNITED STATES PATENTS

| Number | Name | Date |
|---|---|---|
| 1,405,243 | Wing | Jan. 31, 1922 |
| 1,656,139 | Breton | Jan. 10, 1928 |
| 1,836,373 | Kadesch | Dec. 15, 1931 |
| 1,951,649 | Delano | Mar. 20, 1934 |
| 2,478,814 | Ferris | Aug. 9, 1949 |

FOREIGN PATENTS

| Number | Country | Date |
|---|---|---|
| 544,010 | Germany | Feb. 12, 1932 |
| 620,758 | Great Britain | Mar. 30, 1949 |